US012675177B1

(12) United States Patent     (10) Patent No.:   US 12,675,177 B1

Su et al.     (45) Date of Patent:     Jul. 7, 2026

(54) TOUCHPAD PRESSING MODULE

(71) Applicant: Darfon Electronics Corp., Taoyuan City (TW)

(72) Inventors: Feng-Wei Su, Taoyuan City (TW); Chun-Chieh Chen, Taoyuan City (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 0 days.

(21) Appl. No.: 19/176,740

(22) Filed: Apr. 11, 2025

(30)       Foreign Application Priority Data

Apr. 10, 2025    (TW)  ................................. 114113580

(51) Int. Cl.
    *G06F 3/041*        (2006.01)
    *G06F 3/0354*      (2013.01)

(52) U.S. Cl.
    CPC ........ *G06F 3/03547* (2013.01); *G06F 3/0414* (2013.01); *G06F 3/0418* (2013.01)

(58) Field of Classification Search
    CPC ... G06F 3/0418; G06F 3/0414; G06F 3/03547
    USPC .................................................. 345/173, 157
    See application file for complete search history.

(56)          References Cited

U.S. PATENT DOCUMENTS

| | | | |
|---|---|---|---|
| 6,590,565 | B2 | 7/2003 | Hosoya |
| 7,312,791 | B2 | 12/2007 | Hoshino |
| 8,441,450 | B2 | 5/2013 | Degner |
| 8,860,671 | B2 | 10/2014 | Jung |
| 8,866,033 | B2 | 10/2014 | Xue |
| 9,612,674 | B2 | 4/2017 | Degner |
| 10,955,944 | B2 | 3/2021 | Hsu |
| 11,009,916 | B1 | 5/2021 | Chen |
| 11,175,765 | B1 | 11/2021 | Huang |
| 11,287,907 | B1 | 3/2022 | Li |
| 11,314,343 | B2 | 4/2022 | Wang |
| 11,372,457 | B1 | 6/2022 | Lee |
| 11,429,157 | B2 | 8/2022 | Degner |
| 11,435,839 | B2 | 9/2022 | Li |
| 11,442,562 | B2 | 9/2022 | Li |

(Continued)

FOREIGN PATENT DOCUMENTS

| | | |
|---|---|---|
| TW | M457237 U | 7/2013 |
| TW | M613569 U | 6/2021 |

(Continued)

OTHER PUBLICATIONS

TW Office Action dated Apr. 23, 2026 in Taiwan application No. 114113580.

*Primary Examiner* — Calvin C Ma

(74) *Attorney, Agent, or Firm* — McClure, Qualey & Rodack, LLP

(57)           ABSTRACT

A touchpad pressing module includes a touchpad, a plurality of resilient members, and a baseplate. The touchpad is configured to sense a touch operation thereon. The plurality of resilient members are disposed below the touchpad, and each resilient member includes an inner positioning section, an outer fixing section, and a flexible section connected between the inner positioning section and the outer fixing section. The baseplate is disposed below the touchpad, wherein in the stacking direction of the touchpad and the baseplate, the inner positioning section is located within the orthographic projection of the touchpad, and the outer fixing section is located outside the orthographic projection of the touchpad.

19 Claims, 12 Drawing Sheets

(56)            References Cited

U.S. PATENT DOCUMENTS

| | | | |
|---|---|---|---|
| 11,449,156 | B1 | 9/2022 | Li |
| 11,476,063 | B2 | 10/2022 | Li |
| 11,520,383 | B1 | 12/2022 | Li |
| 11,556,155 | B2 | 1/2023 | Liu |
| 11,650,680 | B2 | 5/2023 | Huang |
| 2004/0196268 | A1 | 10/2004 | Hsu |
| 2010/0172080 | A1 | 7/2010 | Bestle |
| 2019/0212842 | A1 | 7/2019 | Hinson et al. |
| 2022/0365558 | A1 | 11/2022 | Degner |
| 2022/0374094 | A1* | 11/2022 | Liu ...................... G06F 3/0202 |
| 2022/0398001 | A1* | 12/2022 | Lahutsik ........... H03K 17/9622 |
| 2023/0079208 | A1* | 3/2023 | Tuan .................... G06F 3/0202 |
| | | | 200/344 |
| 2023/0266829 | A1* | 8/2023 | Sathe ..................... G06F 1/169 |
| | | | 345/168 |
| 2025/0271951 | A1* | 8/2025 | Huang ............... G06F 3/03547 |

FOREIGN PATENT DOCUMENTS

| | | | |
|---|---|---|---|
| TW | I751749 | B | 1/2022 |
| TW | I763340 | B | 5/2022 |
| TW | I768925 | B | 6/2022 |
| TW | I776689 | B | 9/2022 |
| TW | I790531 | B | 1/2023 |

* cited by examiner

TOUCHPAD PRESSING MODULE

CROSS-REFERENCE TO RELATED APPLICATION

This application claims the priority benefits of Taiwan patent application serial No. 114113580, filed on Apr. 10, 2025, and also claims the priority benefits of U.S. provisional application Ser. No. 63/632,569, filed on Apr. 11, 2024. The entirety of the mentioned above patent applications is hereby incorporated by reference herein and made a part of this specification.

BACKGROUND OF THE INVENTION

1. Field of the Invention

The invention generally relates to an input device. Particularly, the invention relates to a touchpad pressing module.

2. Description of the Prior Art

Touchpad is an input device widely used in electronic devices (e.g. laptop computers) for sensing a user's touch operation (e.g. pressing or moving) thereon to control the operation of the electronic device. Currently, when the user presses the touchpad, the force transmission may cause shaking, or the pressing stroke may vary greatly.

SUMMARY OF THE INVENTION

It is an object of the invention to provide a touchpad pressing module, which has the resilient member to transmit the excess force away from the trigger point, so as to prevent the deformation of the baseplate and maintain a certain pressing stroke.

It is another object of the invention to provide a touchpad pressing module, wherein the distance between the force-receiving point and the fixed point of the resilient member is shortened to easily control the transmission direction of force and to reduce the swing of the touchpad during the up-down movement.

It is a further object of the invention to provide a touchpad pressing module, which has the limiting structure and the limiting radius designed to reduce the tilt angle of the touchpad and promote the consistency between the pressing strokes at the center and the corner/periphery of the touchpad.

In an embodiment, the invention provides a touchpad pressing module including a touchpad configured to sense a touch operation thereon, a plurality of resilient members disposed below the touchpad, and a baseplate disposed below the touchpad. Each of the plurality of resilient members includes an inner positioning section, an outer fixing section, and a flexible section connected between the inner positioning section and the outer fixing section. In the stacking direction of the touchpad and the baseplate, the inner positioning section is located within an orthographic projection of the touchpad, and the outer fixing section is located outside the orthographic projection of the touchpad.

In an embodiment, the touchpad pressing module of the invention further includes a housing, wherein the housing has a housing opening. The touchpad is disposed in the housing opening, and the baseplate is fixed onto the housing.

In an embodiment, the outer fixing section is adjacent to or partially overlaps where the baseplate and the housing are fixed, and the outer fixing section is fixed onto the baseplate or the housing.

In an embodiment, the housing has an inner rim defining the housing opening. The outer fixing section is adjacent to the inner rim. The flexible section has a length smaller than ½, ⅓, or ¼ of a length of a long side of the touchpad, or the length of the flexible section is smaller than ½ of a length of a short side of the touchpad.

In an embodiment, the extending direction the outer fixing section crosses the extending direction of the flexible section.

In an embodiment, the touchpad pressing module of the invention further includes a plurality of limiting structures. The plurality of limiting structures are respectively adjacent to a side of the flexible section of a corresponding one of the plurality of resilient members. In the stacking direction, the plurality of limiting structures are located outside the orthographic projection of the touchpad.

In an embodiment, each of the plurality of limiting structures includes an immovable interfering member and a movable interfering member. The immovable interfering member is disposed on the baseplate, and the movable interfering member extends from below the touchpad to correspond to the immovable interfering member.

In an embodiment, the touchpad pressing module of the invention further includes a bracket, wherein the bracket is disposed between the touchpad and the baseplate, and the movable interfering member is disposed on the bracket or the touchpad.

In an embodiment, in a direction, the distance between a center and an edge of the touchpad is a touchpad radius. The distance between the limiting structure and the center of the touchpad is a limiting radius, and the limiting radius is larger than the touchpad radius.

In an embodiment, in the stacking direction, the plurality of limiting structures overlap the housing and are spaced apart from the inner rim by a gap.

In an embodiment, the touchpad includes a switch, and the baseplate has a trigger portion disposed corresponding to the switch.

In an embodiment, the touchpad pressing module of the invention further includes a bracket, wherein the bracket is disposed between the touchpad and the baseplate, and an upper surface of the inner positioning section abuts against a lower surface of the bracket.

In another embodiment, the invention provides a touchpad pressing module including a touchpad configured to sense a touch operation thereon, a plurality of resilient members disposed below the touchpad, a baseplate disposed below the touchpad, and a plurality of limiting structures respectively adjacent to the outer fixing section of a corresponding one of the plurality of resilient members, wherein each of the plurality of resilient members includes an inner positioning section, an outer fixing section, and a flexible section. The flexible section is connected between the inner positioning section and the outer fixing section. In the stacking direction of the touchpad and the baseplate, the plurality of limiting structures are located outside an orthographic projection of the touchpad.

In an embodiment, each of the plurality of limiting structures includes an immovable interfering member and a movable interfering member. The immovable interfering member is disposed on the baseplate. The movable interfering member extends from below the touchpad and configured to interfere with the immovable interfering member in the stacking direction.

In an embodiment, the touchpad pressing module of the invention further includes a bracket disposed between the touchpad and the baseplate, wherein the upper surface of the inner positioning section abuts against the lower surface of the bracket, and the movable interfering member is disposed on the bracket.

In an embodiment, the inner positioning section, the flexible section, and the outer fixing section of the resilient member are sequentially arranged from top to bottom along the stacking direction.

In an embodiment, the plurality of limiting structures are symmetrically disposed around a center of the touchpad.

Compared with the prior art, the touchpad pressing module of the invention has the fixing section of the resilient member disposed adjacent to or partially overlapping the fixed point of the baseplate, so that the excess force can be transmitted to the fixed point of the baseplate to prevent the deformation of the baseplate and maintain a certain pressing stroke. Moreover, the touchpad pressing module of the invention is designed to have the limiting radius of the limiting structure larger than the pressing radius to effectively reduce the tilt angle of the touchpad and promote the consistency between the pressing strokes at the center and the corner/periphery of the touchpad.

DETAILED DESCRIPTION OF THE PREFERRED EMBODIMENT

The invention provides a touchpad pressing module, which can be applied to any suitable electronic device, such as laptop computer, tablet computer, which is in need of touch/pressing type of input/control, but not limited thereto. In other embodiments, the touchpad pressing module can be a standalone device and externally connected to a non-portable or portable electronic device; therefore, users can operate the touchpad pressing module through sliding or pressing thereon by their fingers to control the operation of the electronic device.

Figure 1:
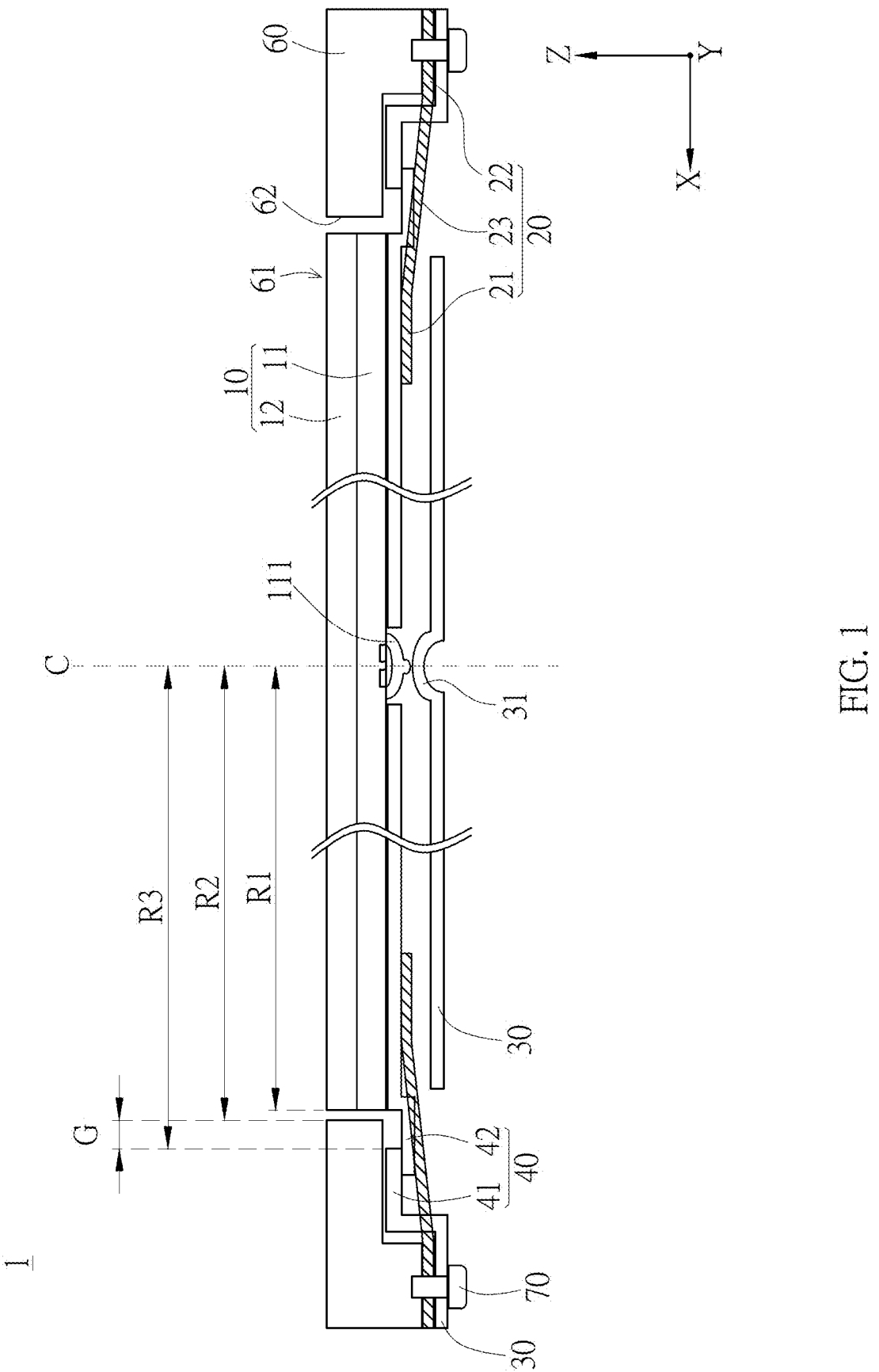
FIG. 1 is a cross-sectional view of the touchpad pressing module in an embodiment of the invention.
Figure 2:
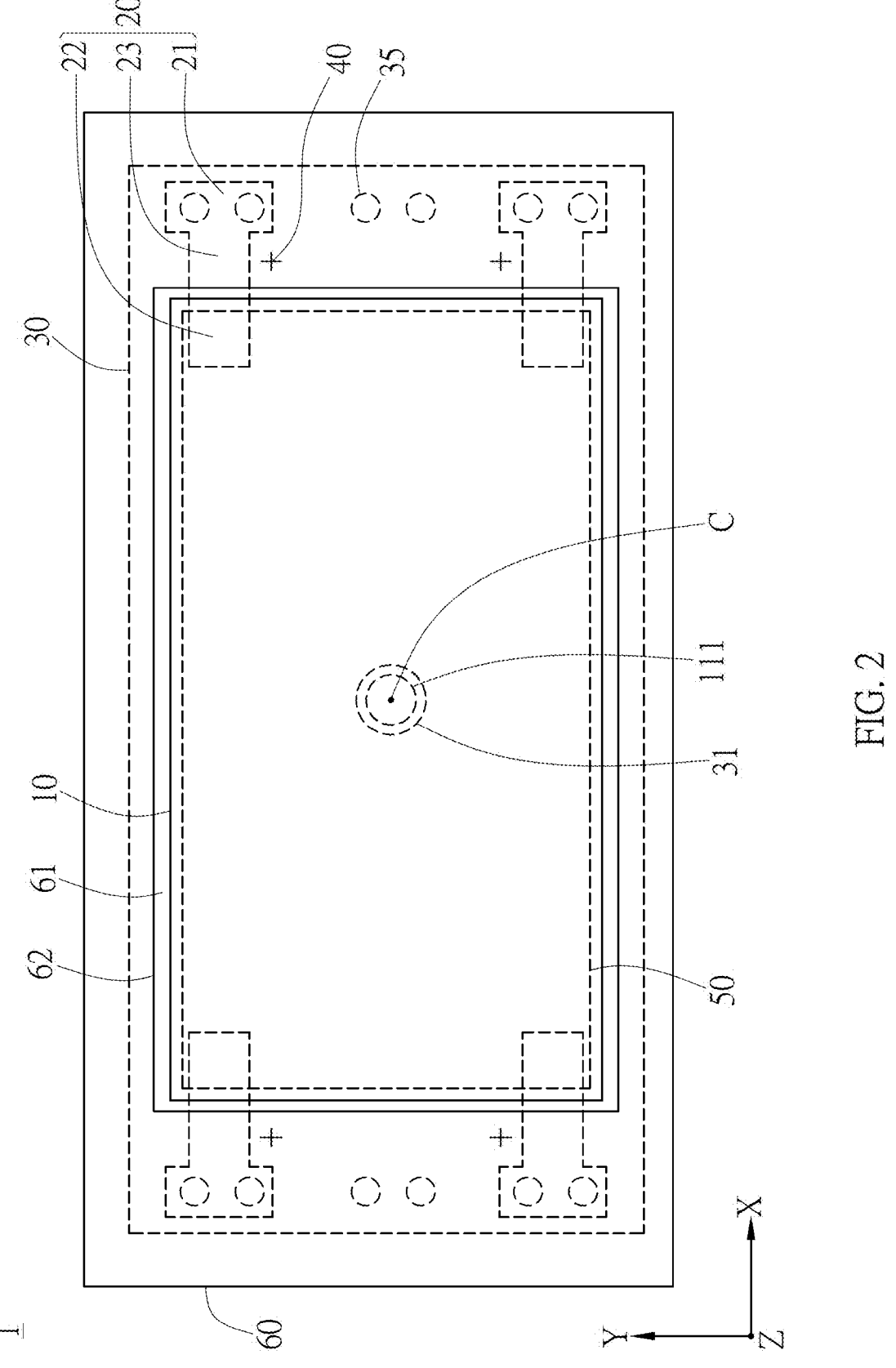
FIG. 2 is a plan view of the touchpad pressing module in an embodiment of the invention.

Referring to FIG. 1 and FIG. 2, FIG. 1 is a cross-sectional view of the touchpad pressing module in an embodiment of the invention; FIG. 2 is a plan view of the touchpad pressing module in an embodiment of the invention. As shown in FIG. 1 and FIG. 2, the touchpad pressing module 1 includes a touchpad 10, a plurality of resilient members 20, and a baseplate 30. The touchpad 10 is configured to sense the touch operation thereon. The plurality of resilient members 20 are disposed below the touchpad 10, and each of the plurality of resilient members 20 has an inner positioning section 21, an outer fixing section 22, and a flexible section 23. The flexible section 23 is connected between the inner positioning section 21 and the outer fixing section 22. The baseplate 30 is disposed below the touchpad 10. In the stacking direction (e.g. Z-axis direction) of the touchpad 10 and the baseplate 3, the inner positioning section 21 is located within the orthographic projection of the touchpad 10, and the outer fixing section 22 is located outside the orthographic projection of the touchpad 10. From another aspect, in the stacking direction (e.g. Z-axis direction) of the touchpad 10 and the baseplate 30, the inner positioning section 21 overlaps the touchpad 10, and the outer fixing section 22 does not overlap the touchpad 10, i.e., the outer fixing section 22 protrudes from the side of the touchpad 10.

Specifically, the touchpad 10 can be a plate body that extends along the XY plane, and the touchpad 10 includes a circuit board 11 and a touch surface, such as the surface of the cover plate 12. The circuit board 11 can be a rigid printed circuit board, a flexible printed circuit board, or a rigid-flex printed circuit board. The circuit board 11 has a touch circuit and a switch circuit. The touch circuit is configured to sense touch operations of fingers or stylus on the touch surface and may include a sensing unit and a sensing circuit (not shown). The switch circuit includes a switch 111 and switch wirings (not shown) and is configured to be triggered to generate a pressing signal upon a certain force being applied to the touch surface. The switch 111 of the touchpad 10 is disposed on the bottom surface of the circuit board 11, preferably at the center C or in the neighborhood of the center C of the touchpad 10, but not limited thereto. According to practical applications, the switch 111 can be located at any suitable position of the touchpad 10. In an embodiment, the switch 111 can be a button type switch or a micro switch. Corresponding to the switch 111 of the touchpad 10, the baseplate 30 preferably has a trigger portion 31. The trigger portion 31 is disposed corresponding to the switch 111 (i.e., the position of the trigger point of the touchpad 10), so that in response to the pressing operation of the user on the touch surface the switch 111 is pressed against the trigger portion 31 to generate the pressing signal. In an embodiment, the trigger portion 31 can be a raised structure on the central region of the baseplate 30 and located right below the switch 111, and there may be a gap or no gap between the trigger portion 31 and the switch 111. In an embodiment, the touchpad 10 includes a cover plate 12, and the touch surface can be the upper surface of the cover plate 12. For example, the cover plate 12 can be a glass plate or a polymer plate disposed on the circuit board 11 and provided for the touch or pressing operation of user.

The resilient member 20 is configured to provide a restoring force to the touchpad 10, so that when the touchpad 10 is subjected to force, the touchpad 10 can perform movements, such as tilting, swinging, moving up-down. As shown in FIG. 1, the inner positioning section 21, the flexible section 23, and the outer fixing section 22 of the resilient member 20 are sequentially arranged from top to bottom along the stacking direction (e.g. Z-axis direction).

In an embodiment, the inner positioning section 21 and the outer fixing section 22 are preferably disposed parallel to the touch surface of the touchpad 10. The flexible section 23 is inclined relative to the stacking direction and is connected between the inner positioning section 21 and the outer fixing section 22, so that the resilient member 20 has a step-like cross section. The inner positioning section 21 is preferably positioned below the touchpad 10, and the outer fixing section 22 may be fixed onto the baseplate 30 and/or the housing 60 (described later). When the touchpad 10 is pressed, the flexible section 23 connected between the inner positioning section 21 and the outer fixing section 22 can deform with respect to the inner positioning section 21 and the outer fixing section 22. For example, as shown in FIG. 1, the inner positioning section 21 abuts against or is connected to the lower surface of the circuit board 11, and the outer fixing section 22 can be fixed onto the baseplate 30. The circuit board 11 and the baseplate 30 form an accommodating space, and the flexible section 23 of the resilient member 20 can be received between the circuit board 11 and the baseplate 30, but not limited thereto. The flexible section 23 can partially or mostly protrude the baseplate 30 no matter whether the flexible section 23 is under force or not under force.

Since the force applied to the touchpad 10 is usually too large, in addition to triggering the switch 111 of the circuit board 11, there is also excess force that needs to be released to other locations. As shown in FIG. 2, the plurality of resilient members 20 preferably respectively extend toward four corners or the periphery of the touchpad 10, so that the excess force can be transmitted away from the trigger portion 31, and the excess force can be absorbed by the resilient members 20 as the restoring force. For example, the plurality of resilient members 20 can individually or together provide an upward support force of about 10 to 50 grams, which is configured to (1) provide the basic tactile resistance when being pressed by the user, (2) absorb the excess pressing force as the restoring force, and (3) push the touchpad 10 back to the non-pressed state with the restoring force after being pressed. For example, four resilient members 20 can be disposed corresponding to four corners of the touchpad 10, so that each resilient member 20 extends along such as X-axis direction from the corner/periphery of the touchpad 10 to the corresponding corner/periphery of the baseplate 30, but not limited thereto. Moreover, the extending direction of the outer fixing section 22 preferably crosses the extending direction of the flexible section 23. For example, the outer fixing section 22 and the flexible section 23 can be arranged in T shape or L shape. With such a configuration, the outer fixing section 22 has a component vertical to the flexible section 23, so that the transmission direction of force can be easily controlled, and the swing of the touchpad 10 during the up-down movement can be reduced. The number, shape, and location of the resilient members 20 can be modified according to practical applications, not limited to the embodiment. For example, the outer fixing sections 22 of two adjacent resilient members 20 can be connected to each other to form one U-shaped resilient member 20 (shown in FIG. 3).

The distance between the force-receiving point (e.g. the inner positioning section 21) and the fixed point (e.g. the outer fixing section 22) of the resilient member 20 disposed around the touchpad 10 is preferably short enough to prevent the flexible section 23 of the resilient member 20 from being too long, so that the short pressing stroke cannot transmit sufficient force to trigger the switch 111, and accordingly, the increased pressing stroke or pressing force will be required to trigger the switch 111. In an embodiment, the length of the flexible section 23 is preferably smaller than ½, ⅓, or, ¼ of the length of the long side of the touchpad 10, or the length of the flexible section 23 is preferably smaller than ½ of the length of the short side of the touchpad 10. For example, as shown in FIG. 2, the length of the flexible section 23 can be smaller than ½, ⅓, or ¼ of the length of the long side of the touchpad 10 in the X-axis direction, or the length of the flexible section 23 can be smaller than ½ of the short side of the touchpad 10 in the Y-axis direction.

In an embodiment, the touchpad pressing module 1 may further include a housing 60, wherein the housing 60 has a housing opening 61 and an inner rim 62, which defines the housing opening 61. The touchpad 10 is disposed in the housing opening 61, and the outer rim of the touchpad 10 is surrounded by the inner rim 62 of the housing 60. From another aspect, when the touchpad 10 is disposed in the housing opening 61, the sidewall of the touchpad 10 preferably faces the sidewall of the housing opening 61. Specifically, the housing 60 can be embodied as the device housing of the electronic device, such as the keyboard upper housing of the laptop computer, but not limited thereto. The size and shape of the housing opening 61 preferably correspond to those of the touchpad 10. When the touchpad 10 is disposed on the housing 60, the touch surface (e.g. the cover plate 12) can be exposed from the housing opening 61 for the user to operate. For example, the housing opening 61 can be a rectangular opening, and the inner rim 62 is the sidewall that surrounds the housing opening 61.

The baseplate 30 is preferably fixed onto the housing 60 by one or more fixing members 70, so that the outer fixing section 22 of the resilient member 20 is adjacent to or partially overlaps where the baseplate 30 and the housing 60 are fixed. For example, the fixing member 70 can be a screw or a bolt, which is secured to the corresponding holes (e.g. 35, 65) of the baseplate 30 and the housing 60, but not limited thereto. In other embodiments, the fixing member 70 can be a hot-melt material, which is melt and cured after being inserted into the corresponding holes of the baseplate 30 and the housing 60 to achieve the fixing effect. In an embodiment, the outer fixing section 22 of the resilient member 20 can be sandwiched between the baseplate 30 and the housing 60 and is fixed together with the baseplate 30 onto the housing 60 by a same fixing member 70, but not limited thereto. In another embodiment, the outer fixing section 22 of the resilient member 20 and the baseplate 30 can be separately fixed onto the housing 60 by different fixing members 70. In other words, the outer fixing section 22 of the resilient member 20 is not necessarily fixed onto the baseplate 30, but directly fixed onto the housing 60. Specifically, since the corner of the touchpad 10 is a point that is farthest from the center C of the touchpad 10, when this point receives force, most of the excess force is preferably transmitted toward or absorbed by the outer fixing section 22 of the resilient member 20 in the shortest time/distance, so as to prevent the excess force from being transmitted to the trigger portion 31 of the baseplate 30. Therefore, the outer fixing section 22 of the resilient member 20 is preferably adjacent to the inner rim 62 of the housing 60 and close to the corner/periphery of the touchpad 10. In the case that the rigidity in the neighborhood of the inner rim 62 of the housing 60 is smaller than the rigidity of the baseplate 30, the outer fixing section 22 of the resilient member 20 is preferably fixed onto the baseplate 30 and is adjacent to or overlap where the baseplate 30 and the housing 60 are fixed. With such a configuration, when the touchpad 10 is pressed, the resilient member 20 can transmit the excess force to the fixed point of the baseplate 30 (i.e., where the baseplate 30 and the housing 60 are fixed), so as to prevent the deformation of the baseplate 30 and maintain a certain pressing stroke. In the case that the rigidity in the neighborhood of the inner rim 62 of the housing 60 is larger than the rigidity of the baseplate 30, the outer fixing section 22 of the resilient member 20 can be directly fixed onto the housing 60 and located near the inner rim 62. With such a configuration, the resilient member 20 can transmit the excess force to the housing 60, so as to prevent the deformation of the baseplate 30 and maintain a certain pressing stroke.

In an embodiment, as shown in FIG. 1 and FIG. 2, the touchpad pressing module 1 may further include a plurality of limiting structures 40. The plurality of limiting structures 40 are respectively adjacent to a side of the flexible section 23 of a corresponding one of the plurality of resilient members 20. In the stacking direction (e.g. Z-axis direction), the plurality of limiting structures 40 are preferably located outside the orthographic projection of the touchpad 10. From another aspect, in the stacking direction, the plurality of limiting structures 40 and the touchpad 10 do not overlap with each other, and the plurality of limiting structures 40 preferably overlap the housing 60 and are spaced apart from the inner rim 62 by a gap G. Specifically, as shown in FIG. 1, in a direction (e.g. X-axis direction), the distance between the center C of the touchpad 10 and the edge of the touchpad 10 is the touchpad radius R1. The distance between the center C of the touchpad 10 and the inner rim 62 of the housing 60 is the opening radius R2. The distance between the limiting structure 40 and the center C of the touchpad 10 is the limiting radius R3. The limiting radius R3 is preferably larger than the opening radius R2, and the opening radius R2 is preferably slightly larger than the touchpad radius R1. The difference between the limiting radius R3 and the opening radius R2 is the gap G. In an embodiment, the gap G is preferably 0.5 mm to 10 mm, but not limited thereto. In the case that the limiting radius R3 is too short, for example, the limiting radius R3 smaller than the touchpad radius R1, or in the stacking direction the limiting structure 40 overlapping the touchpad 10, or the limiting structure 40 located in the housing opening 61 or overlapping the housing opening 61, the pressing stroke at the opposite side of the pressing force will be too long, resulting in a large difference in pressing stroke between the center and the corner/periphery of the touchpad 10 and a large swing angle of the touchpad 10. The invention is designed to increase the limiting radius R3 (e.g. the limiting radius R3>the touchpad radius R1), which can reduce the tilt angle of the touchpad 10, so that the pressing stroke at the corner/periphery of the touchpad 10 can be reduced, and the difference in pressing stroke between the center and the corner/periphery of the touchpad 10 is small to achieve high consistency.

In an embodiment, each of the plurality of limiting structures 40 preferably includes an immovable interfering member 41 and a movable interfering member 42. In the stacking direction (e.g. Z-axis direction), the immovable interfering member 41 and the movable interfering member 42 at least partially overlap with each other. When the touchpad 10 moves relative to the baseplate 30, the immovable interfering member 41 can interfere with the movable interfering member 42 to achieve the limiting effect. In an embodiment, the immovable interfering member 41 is disposed on the baseplate 30, and the movable interfering member 42 extends from below the touchpad 10 to correspond to the immovable interfering member 41 and is configured to interfere with the immovable interfering member 41 in the stacking direction. For example, as shown in FIG. 1, the immovable interfering member 41 and the movable interfering member 42 can be embodied as a pair of hooks. The immovable interfering member 41 can be bent from the baseplate 30 toward the touchpad 10 (e.g. upward). The movable interfering member 42 can extend downward from the circuit board 11 of the touchpad 10 and protrude beyond the side edge of the touchpad 10 to be correspondingly below the immovable interfering member 41. As shown in FIG. 2, the plurality of limiting structures 40 are preferably symmetrically arranged around the center C of the touchpad 10. When pressing the corner/periphery of the touchpad 10, there is the limiting structure 40 (i.e., the contact point of the immovable interfering member 41 and the movable interfering member 42) at the opposite side of the force-receiving point with respect to the trigger point (i.e., the position of the switch 111 and the trigger portion 31), and the limiting radius R3 of the limiting structure 40 is larger than the pressing radius (e.g. the touchpad radius R1) at the force-receiving point, which can reduce the tilt angle of the touchpad 10 and shorten the pressing stroke at the corner/periphery of the touchpad 10.

Figure 3:
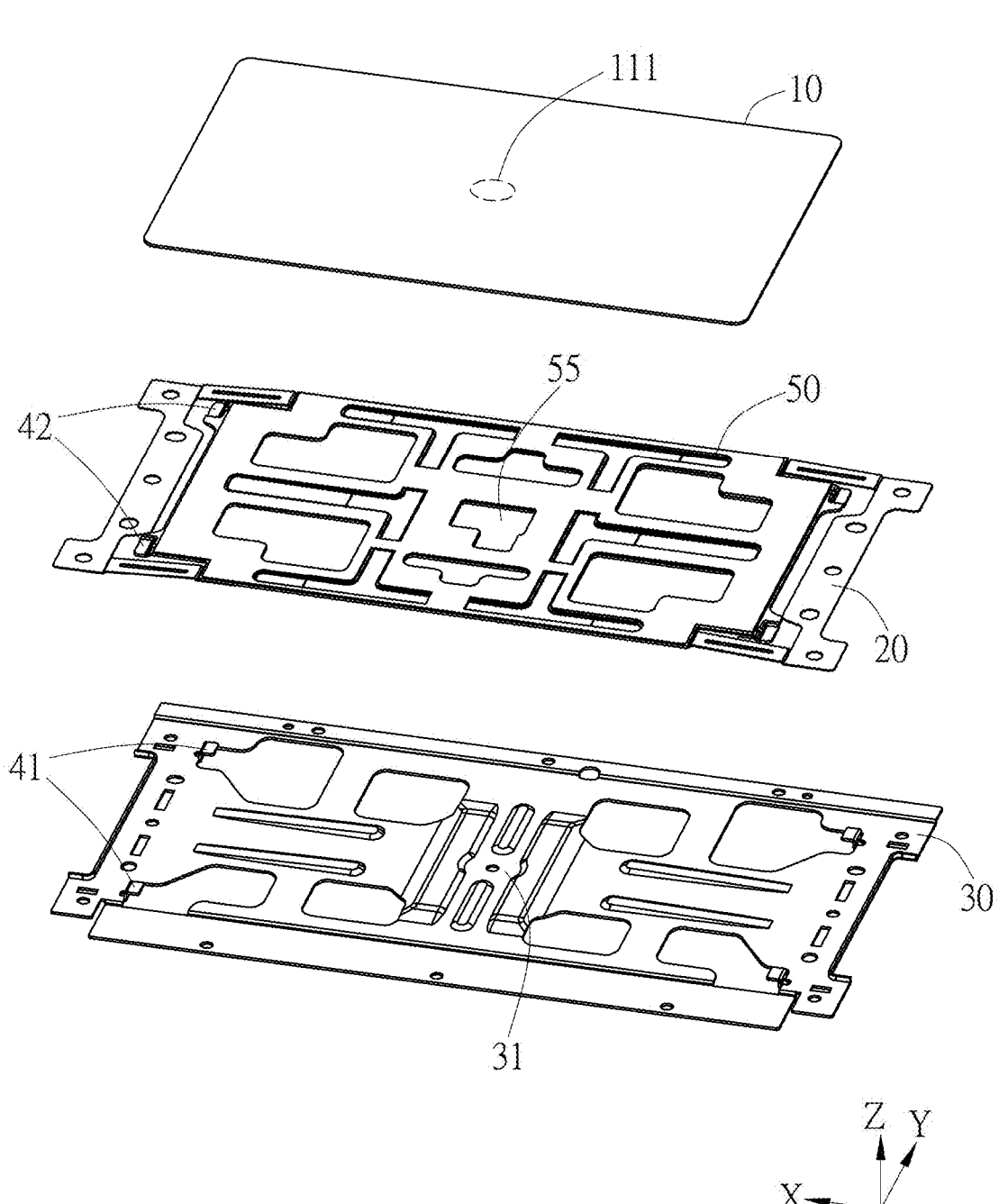
FIG. 3 is an exploded view of the touchpad pressing module in another embodiment of the invention.

Referring to FIG. 3, FIG. 3 is an exploded view of the touchpad pressing module in another embodiment of the invention, the differences between this embodiment and the previous embodiment are described. For the same or similar details (e.g. the touchpad 10, the resilient member 20, the baseplate 30), please refer to the relevant description of the previous embodiment. As shown in FIG. 3, in this embodiment, the touchpad pressing module 1 further includes a bracket 50. The bracket 50 is disposed between the touchpad 10 and the baseplate 30 and configured to increase the structural strength of the touchpad 10. Moreover, compared with the previous embodiment that the movable interfering member 42 is disposed on the circuit board 11 of the touchpad 10, in this embodiment, the movable interfering member 42 is disposed on the bracket 50.

Figure 4:
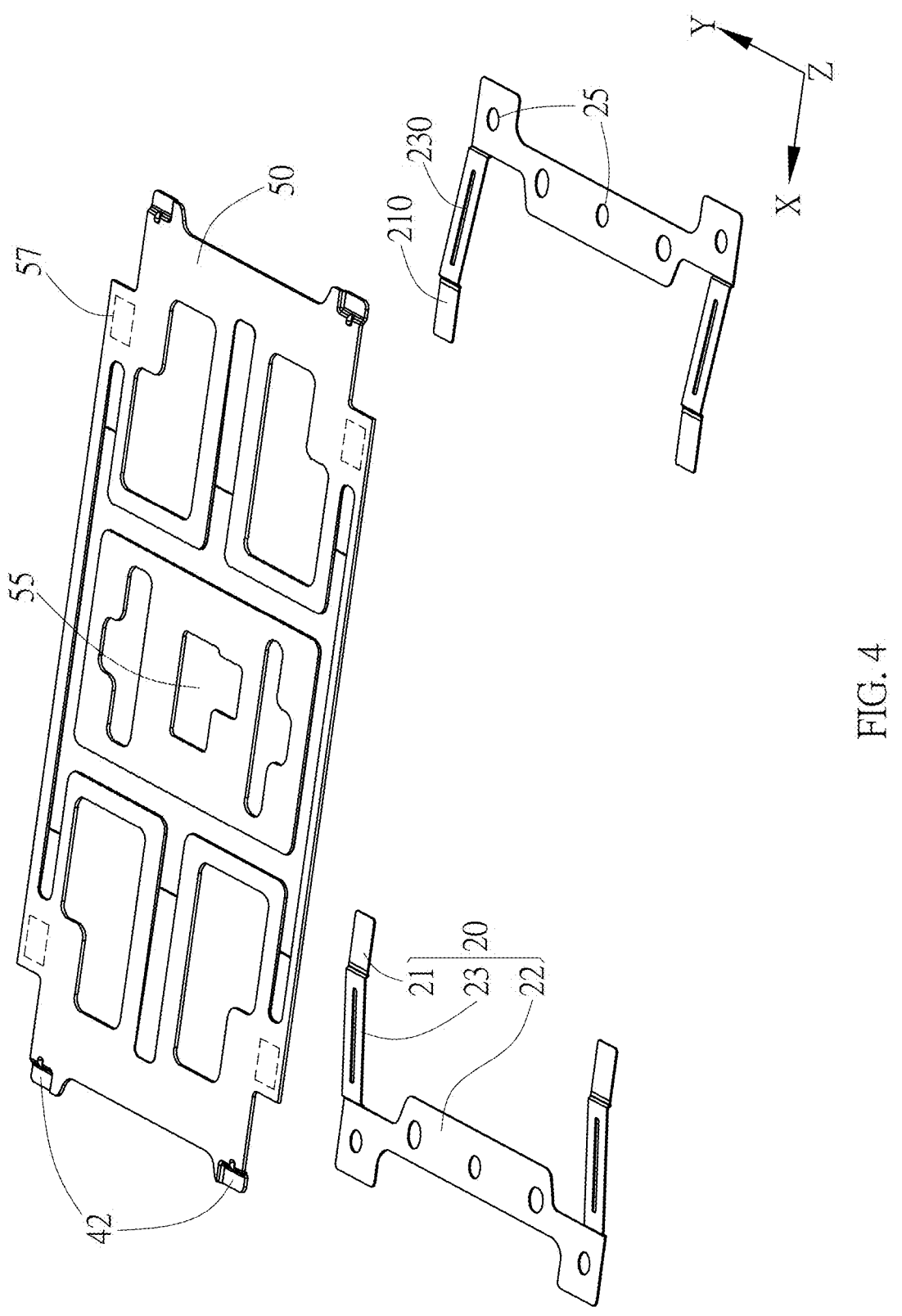
FIG. 4 and FIG. 5 are respectively a disassembly view and an assembly view of the bracket and the resilient member in an embodiment of the invention.
Figure 5:
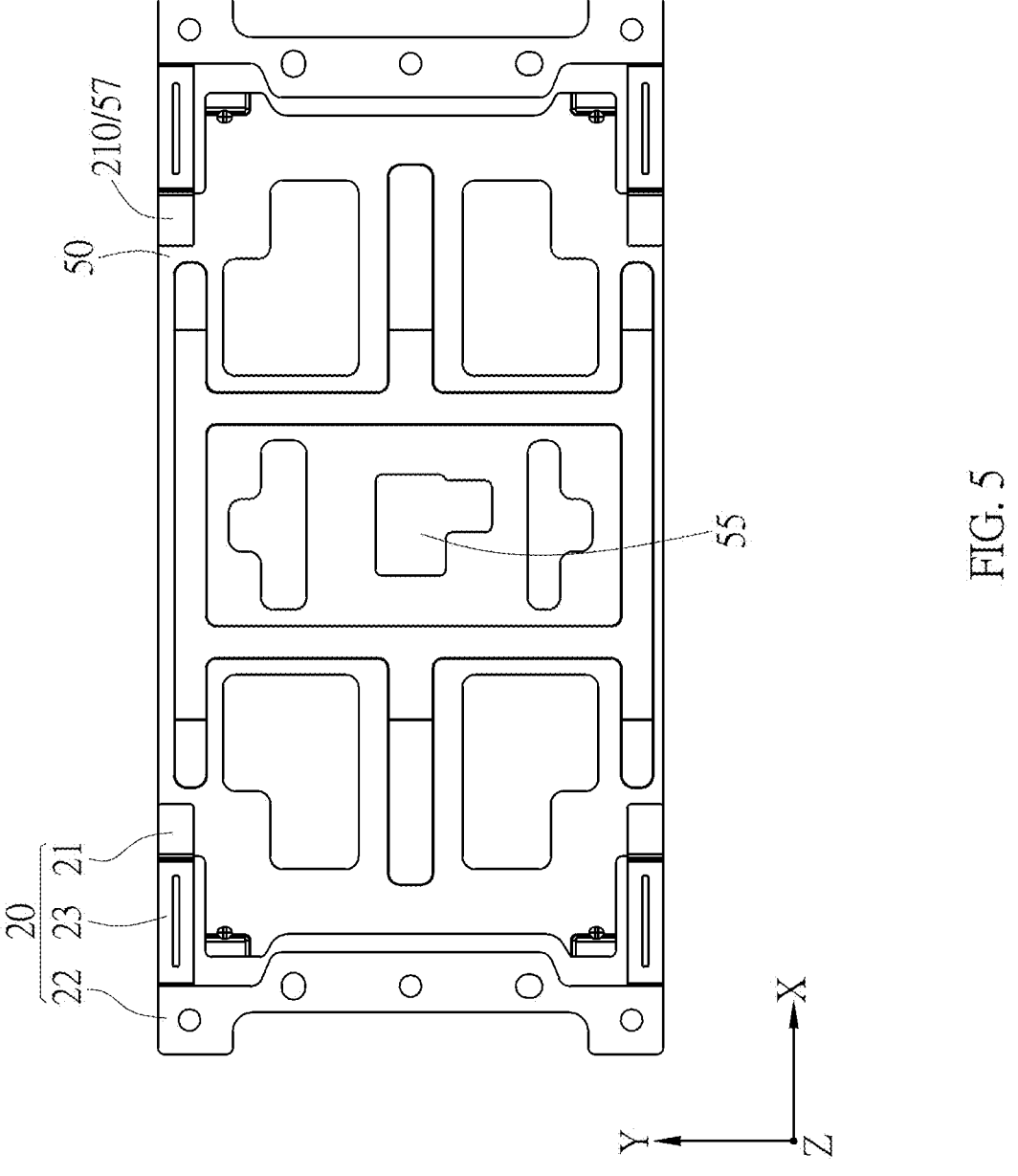

Specifically, referring to FIG. 3 to FIG. 5, FIG. 4 and FIG. 5 are respectively a disassembly view and an assembly view of the bracket 50 and the resilient member 20 in an embodiment of the invention. As shown in FIG. 3 to FIG. 5, in this embodiment, the resilient member 20 can be embodied as a U-shaped resilient member, wherein the outer fixing section 22 extends along the Y-axis direction, and two flexible sections 23 are disposed at two opposite ends of the outer fixing section 22 along the Y-axis direction. Each of the two flexible sections 23 inclinedly extends upward along the X-axis direction to connect the respective inner positioning section 21. The resilient member 20 has a plurality of coupling holes 25. The plurality of coupling holes 25 are disposed in the outer fixing section 22 along the Y-axis direction and configured to be fixed or positioned with the baseplate 30 and/or the housing 60. The flexible section 23 can have a slit 230, which is configured to increase the flexibility or deformability of the flexible section 23. In this embodiment, the long axis of the slit 230 extends along the long axis direction (e.g. X-axis direction) of the flexible section 23, but not limited thereto. In another embodiment, one or more slits 230 can be disposed along the short axis direction (e.g. Y-axis direction) of the flexible section 23, so that the flexible section 23 may be a snake-like flexible arm having a Z shape or multiple bends. The upper surface 210 of the inner positioning section 21 of the resilient member 20 is configured to abut against or connect the lower surface (e.g. 57) of the bracket 50.

The bracket 50 preferably has a size and a shape corresponding to those the touchpad 10, so that the movable interfering members 42 disposed on the bracket 50 can protrude from the corners/periphery and beyond the side edge of the touchpad 10. In this embodiment, the movable interfering member 42 is embodied as a step-like hook, which is bent downward from the bracket 50. Moreover, four corners of the bracket 50 are retreated with respect to the movable interfering members 42, so that the lower surface 57 of the retreated corner can serve as a fitting surface, which is connected to or abuts the upper surface 210 of the inner positioning section 21 of the resilient member 20. As shown in FIG. 5, when the upper surface 210 of the inner positioning section 21 of the resilient member 20 abuts against the lower surface 57 of the corner of the bracket 50, the flexible section 23 is located in the retreat area beside the movable interfering member 42, and the outer fixing section 22 is located outside the bracket 50. Moreover, the bracket 50 has a switch hole 55, which is configured to allow the switch 111 to pass therethrough to correspond to the trigger portion 31 of the baseplate 30.

Figure 6:
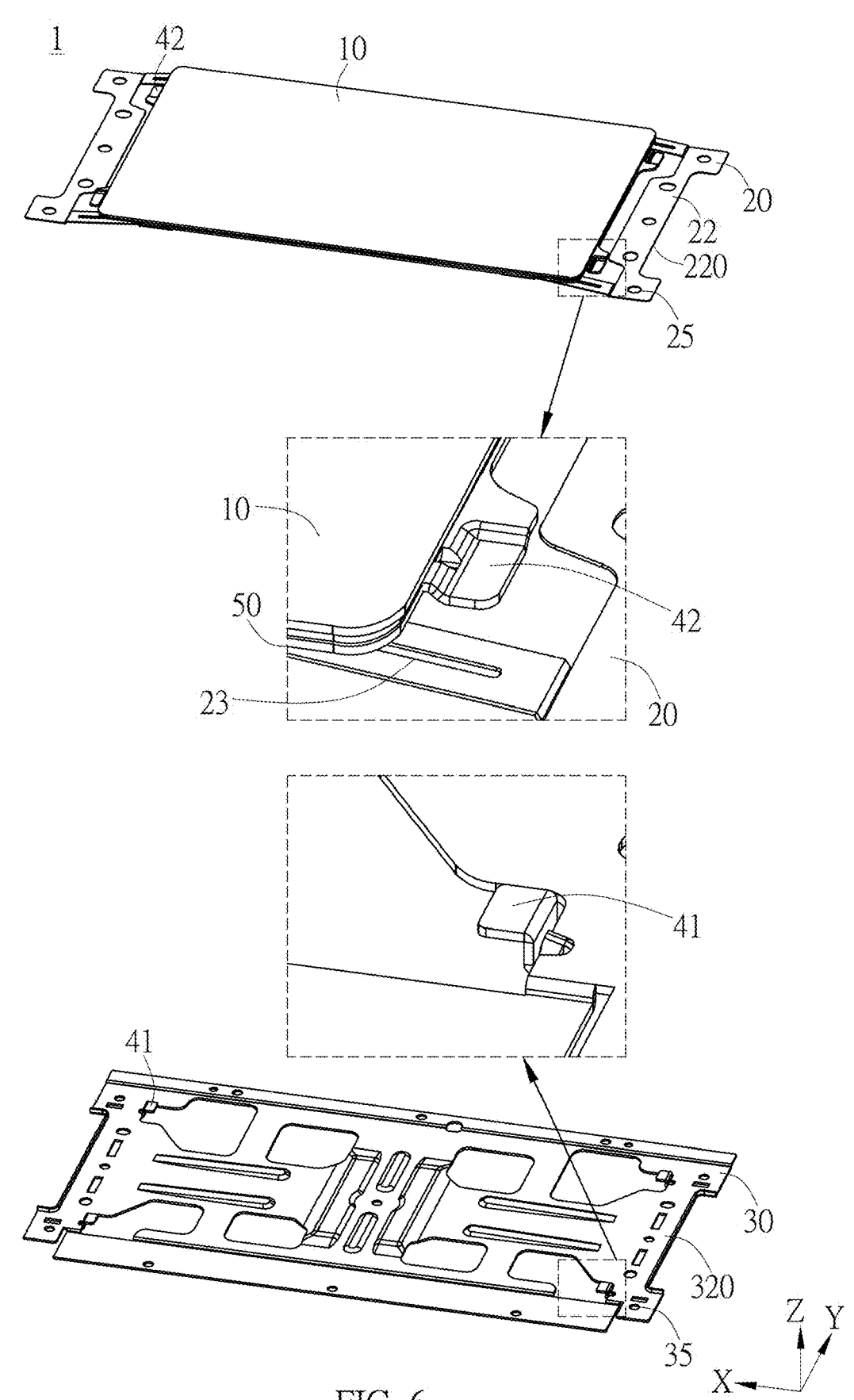
FIG. 6 and FIG. 7 are respectively a disassembly view and an assembly view of the limiting structure in an embodiment of the invention.
Figure 7:
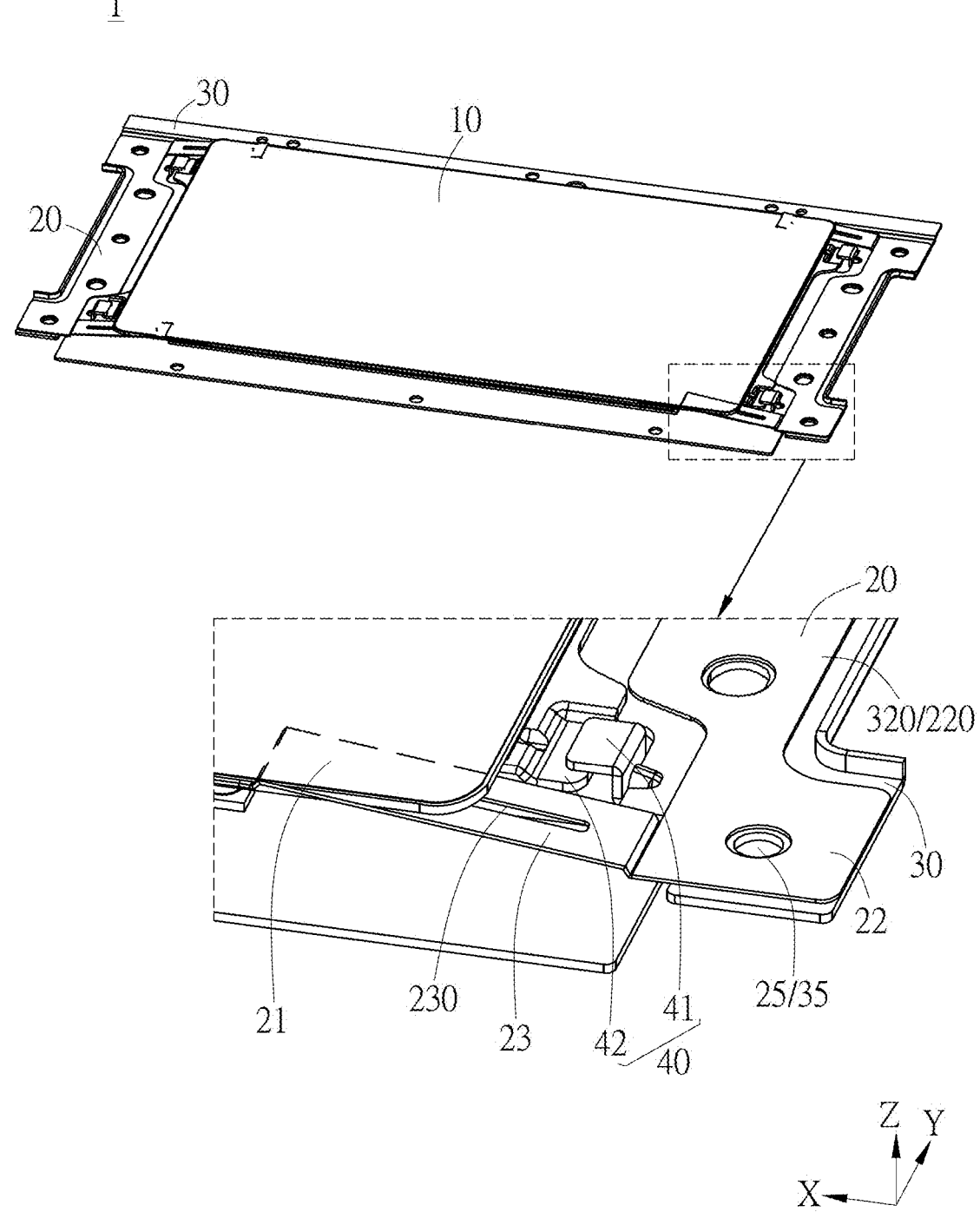

Referring to FIG. 3, FIG. 6 and FIG. 7, FIG. 6 and FIG. 7 are respectively a disassembly view and an assembly view of the limiting structure in an embodiment of the invention. As shown in FIG. 3, FIG. 6 and FIG. 7, corresponding to the bent-downward movable interfering member 42 of the bracket 50, the baseplate 30 has the immovable interfering member 41 bent upward, so that the immovable interfering member 41 protrudes above and overlaps the movable interfering member 42 in the Z-axis direction. Moreover, the baseplate 30 has an upper surface 320 configured to fit with the lower surface 220 of the outer fixing section 22 of the resilient member 20, and a coupling hole 35 configured to corresponding to the coupling hole 25 of the outer fixing section 22. As shown in FIG. 7, when the bracket 50, the resilient member 20 and the baseplate 30 are positioned relative to each other, the upper surface 210 of the inner positioning section 21 abuts against the lower surface 57 of the corner of the bracket 50; the flexible section 23 is located in the retreat area beside the movable interfering member 42; the lower surface 220 of the outer fixing section 22 is fitted with the upper surface 320 of the baseplate 30 and located outside the bracket 50; the coupling hole 25 of the outer fixing section 22 is aligned and communicates with the coupling hole 35 of the baseplate 30 for positioning or securing; the movable interfering member 42 of the bracket 50 and the immovable interfering member 41 of the baseplate 30 constitute the limiting structure 40.

Similar to the previous embodiment, in this embodiment, the outer fixing section 22 of the resilient member 20 is located outside the orthographic projection of the touchpad 10 in the Z-axis direction and can be fixed onto the baseplate 30 and/or the housing 60 to effectively transmit the excess force to the baseplate 30 or the housing 60, so as to prevent the deformation of the baseplate 30 and maintain a certain pressing stroke. Moreover, when pressing the corner or periphery of the touchpad 10, the distance between the force-receiving point and the fixed point of the resilient member 20 is reduced (i.e., the length of the flexible section 23 is short enough), easy to control the transmission direction of force and reduce the swing of the touchpad 10 during the up-down movement. The design of the limiting structure 40/the limiting radius R3 can reduce the tilt angle of the touchpad 10 and shorten the pressing stroke at the corner/periphery of the touchpad 10, so that the difference in pressing stroke between the center and the corner/periphery of the touchpad 10 can be reduced to achieve a high consistency.

Figure 8:
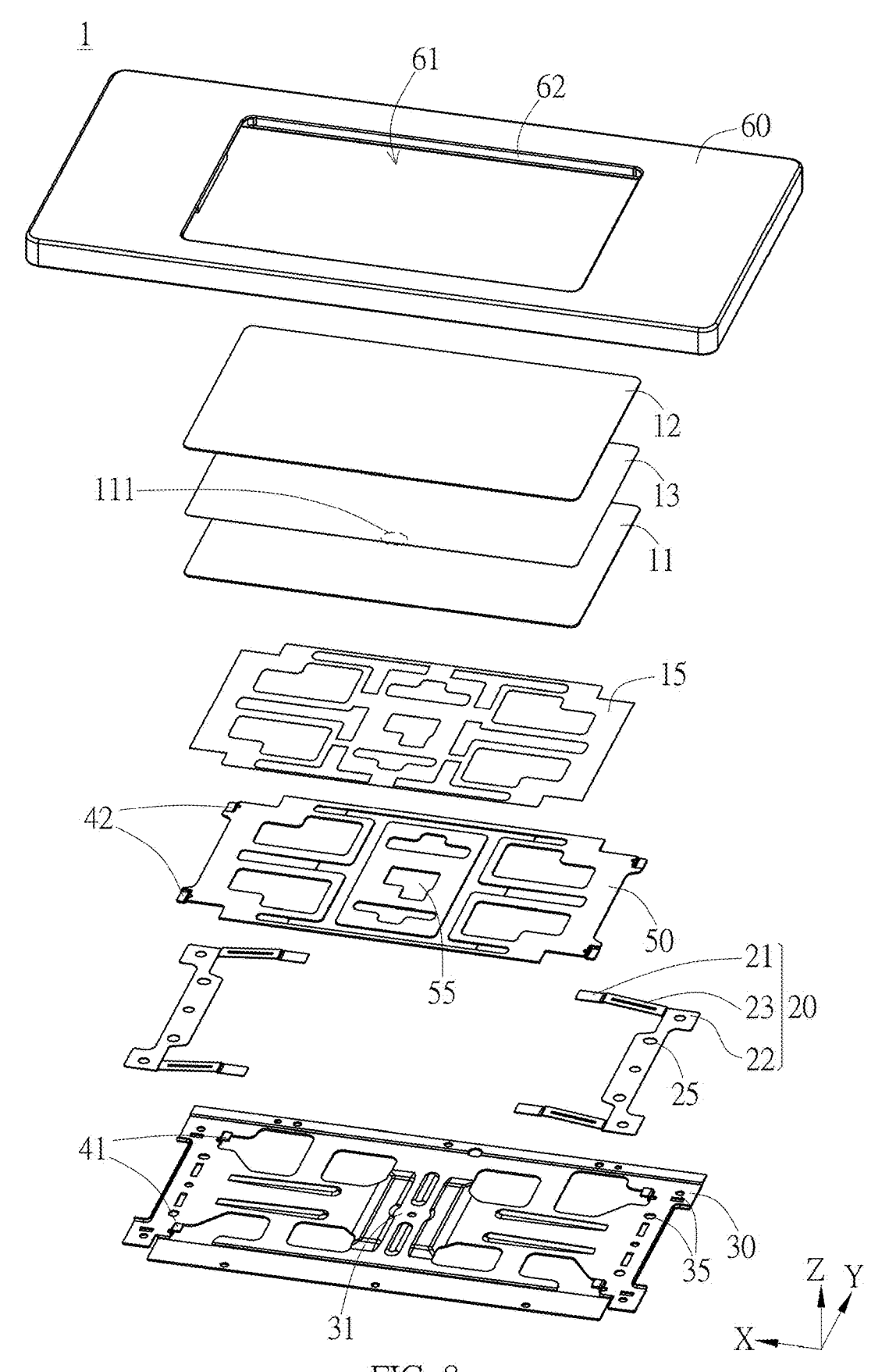
FIG. 8 is an exploded view of the touchpad pressing module in yet another embodiment of the invention.
Figure 9:
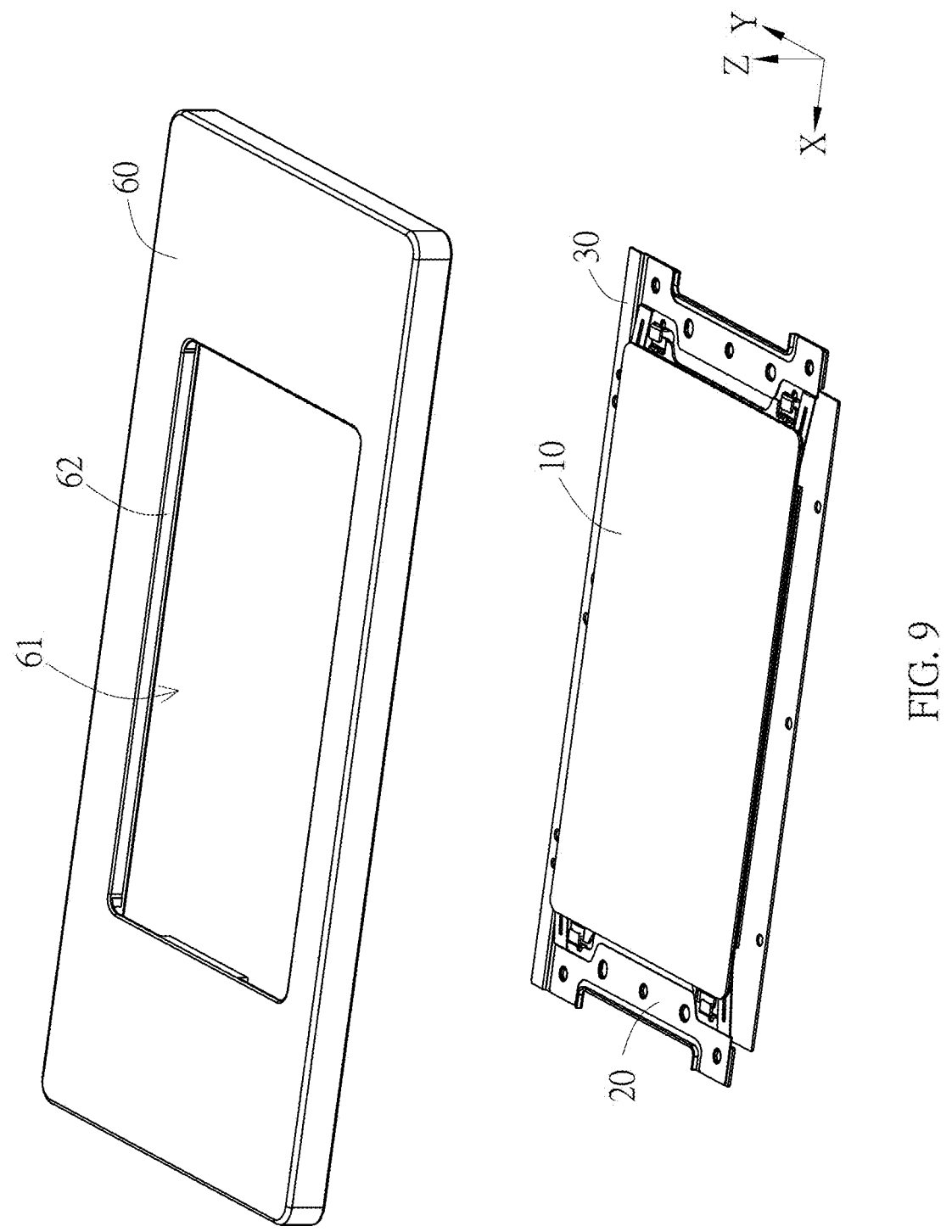
FIG. 9 and FIG. 10 are respectively exploded top and bottom views of the touchpad pressing module in an embodiment of the invention.
Figure 10:
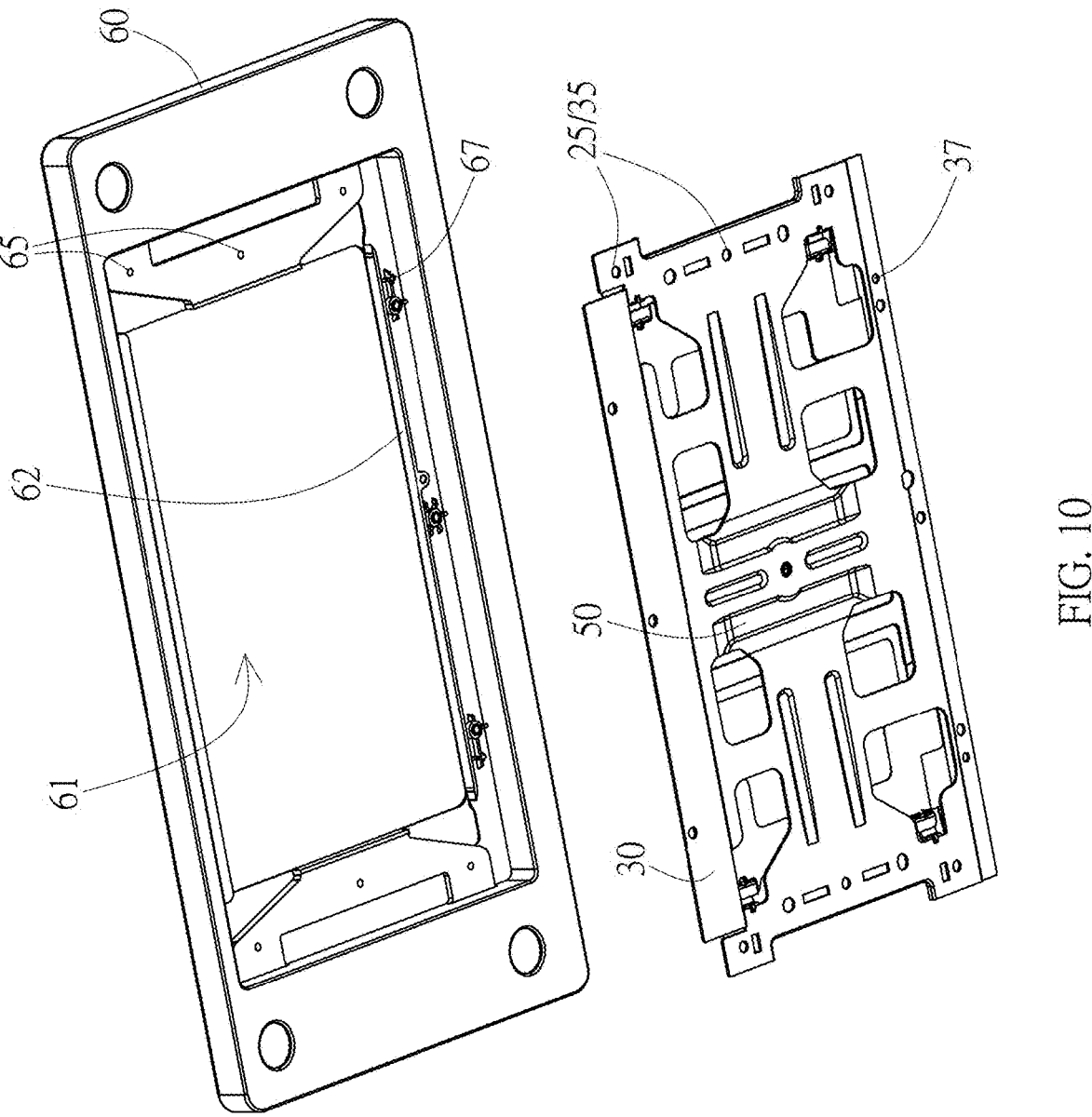

Referring to FIG. 8, FIG. 8 is an exploded view of the touchpad pressing module in yet another embodiment of the invention. As shown in FIG. 8, in this embodiment, the cover plate 12 can be combined with the circuit board 11 through the first adhesive layer 13 to form the touchpad 10. The length/width of the first adhesive layer 13 and the circuit board 11 can be slightly smaller than that of the cover plate 12. The lower surface (e.g. 57) of the bracket 50 and the upper surface (e.g. 210) of the inner positioning section 21 of the resilient member 20 can be connected by welding or adhesives. Then, the bracket 50 can be attached to the touchpad 10 by the second adhesive layer 15. Since the flexible section 23 is inclinedly connected between the inner positioning section 21 and the outer fixing section 22 along the stacking direction, so that the touchpad 10 can be supported by the resilient member 20 in a suspended manner to maintain the level of the touchpad 10 and control the movement of the touchpad 10 relative to the XY plane. Next, the baseplate 30 is assembled with the bracket 50 and the resilient member 20 to form the touchpad pressing module 1. For example, the bracket 50 with the touchpad 10 suspendedly supported by the resilient member 20 can be placed on the baseplate 30 and pressed toward the baseplate 30, so that the flexible section 23 of the resilient member 20 is deformed. By laterally moving (e.g. moving left/right) the bracket 50 with the touchpad 10 supported by the resilient member 20, the movable interfering member 42 of the bracket 50 can be hooked below the immovable interfering member 41 of the baseplate 30. Then, the entire touchpad pressing module 1 can be placed in a jig to position the cover plate 12 and the baseplate 30, and the lower surface (e.g. 220) of the outer fixing section 22 of the resilient member 20 and the upper surface (e.g. 320) of the baseplate 30 can be welded or adhered together. Furthermore, as shown in FIG. 9 and FIG. 10, the touchpad pressing module 1 can be combined with the housing 60 to be fixed onto the housing 60, so that the cover plate 12 is exposed from the housing opening 61 of the housing 60. Specifically, the touchpad pressing module of FIG. 9 can be the touchpad pressing module of any of the embodiments of FIG. 1 to FIG. 3, and the housing 60 has one or more coupling holes 65 corresponding to the coupling hole(s) 25/35 of the touchpad pressing module. For example, the coupling hole 65 is preferably disposed on the lower surface of the housing 60 and adjacent to the housing opening 61 or near the inner rim 62. The touchpad pressing module can be fixed onto the housing 60 from bottom to top by the fixing member (e.g. 70). Moreover, the housing 60 and the baseplate 30 may have corresponding positioning mechanisms, such as the positioning rod 67 and the positioning hole 37, so that alignment/positioning can be performed before the fixing member 70 is secured, facilitating the assembly process.

Figure 11:
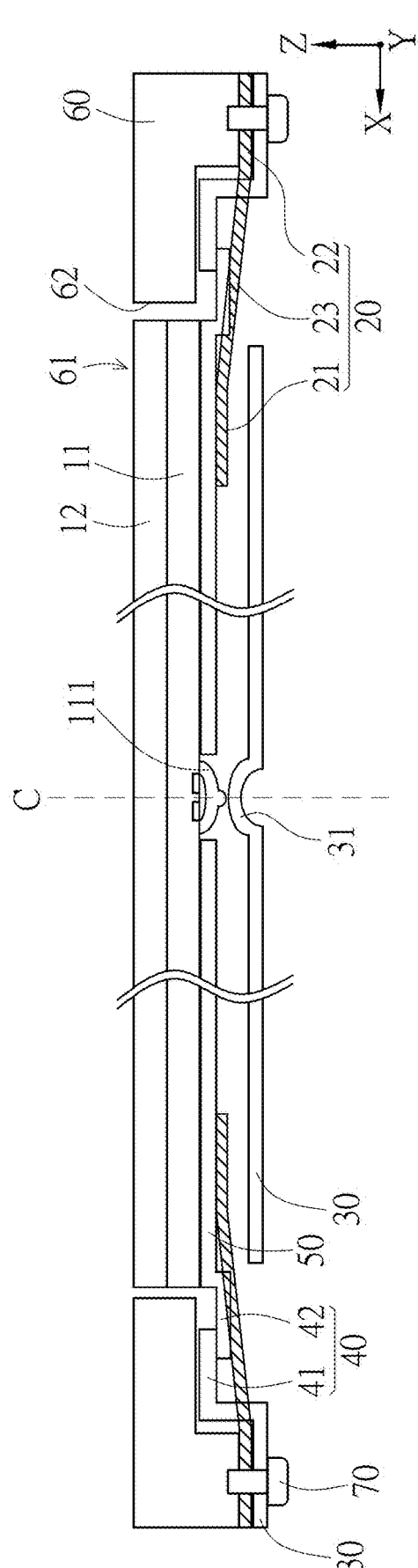
FIG. 11 and FIG. 12 are respectively schematic views of the touchpad pressing module at the non-pressed state and the pressed state in an embodiment of the invention.
Figure 12:
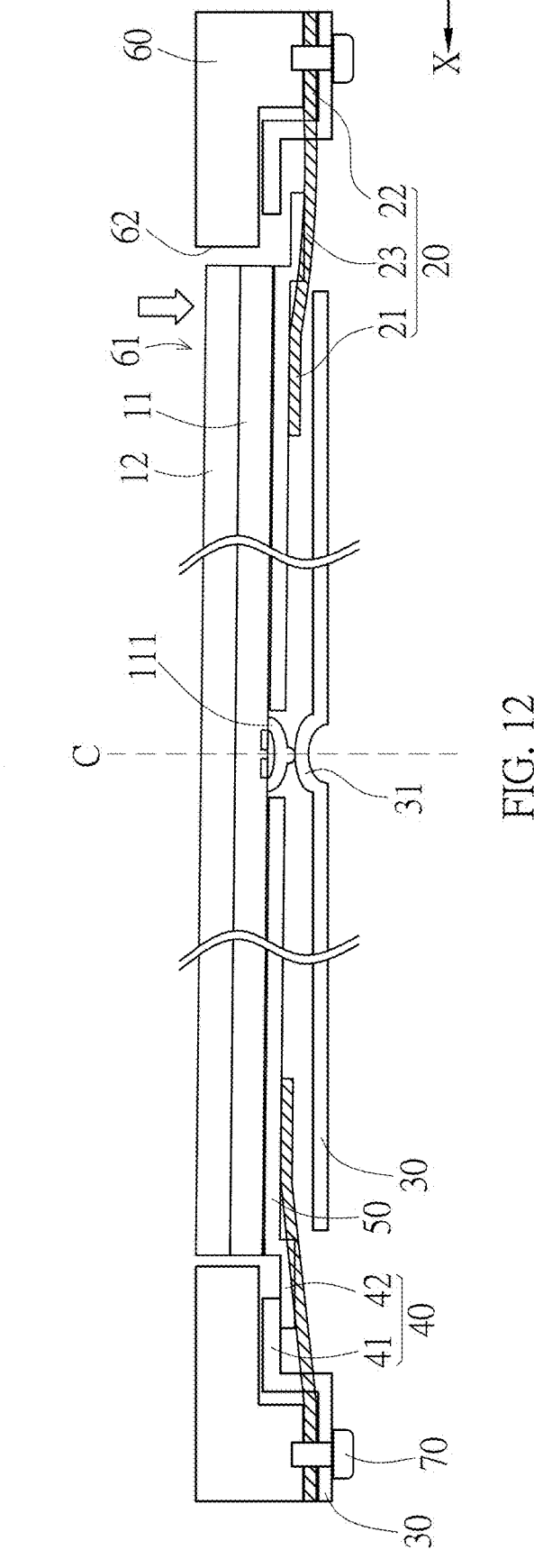

Referring to FIG. 11 and FIG. 12, FIG. 11 and FIG. 12 are respectively schematic views of the touchpad pressing module at the non-pressed state and the pressed state in an embodiment of the invention. Hereinafter, the operation of the touchpad pressing module will be described. As shown in FIG. 11, the trigger portion 31 on the central region of the baseplate 30 is located right below the switch 111 of the circuit board 11. When the force is applied to the central region of the touchpad 10, the touchpad 10 can levelly lower down in a relatively stable manner. Ideally, the lowest point of the touchpad 10 is the height of the contact of the topmost point of the trigger portion 31 of the baseplate 30 and the switch 111. However, since the switch 111 usually includes a metal dome, practically the touchpad 10 will not stop lowering upon the switch 111 of the circuit board 11 contacting the trigger portion 31 of the baseplate 30, but the metal dome of the switch 111 will further collapse to contact a pair of electrodes of the switch; consequently, the touchpad 10 will further slightly lower down in practical.

As shown in FIG. 12, when pressing the corner or periphery of the touchpad 10, the touchpad 10 will inclinedly lower down, and the side of the touchpad 10 opposite to the force-receiving side or corner will correspondingly tilt upward. The touchpad pressing module of the invention is provided with the plurality of limiting structures 40, which are disposed around and outside the touchpad 10 and located beside the flexible section 23 of the resilient member 20. When pressing the corner/periphery of the touchpad 10, at the side opposite to the force-receiving point with respect to the trigger point (i.e., the position of the switch 111 and the trigger portion 31) is provided with the limiting structure(s) 40, and the plurality of limiting structures 40 are symmetrically arranged around the center C of the touchpad 10 adjacent to the corner in the neighborhood of the inner rim 62 of the housing 60 and close to the outer fixing section 22 of the resilient member 20. Therefore, the design of the limiting structure/the increased limiting radius R3 can reduce the tilt angle of the touchpad 10 and shorten the pressing stroke at the corner/periphery of the touchpad 10, so that the difference in pressing stroke between the center and the corner/periphery of the touchpad 10 can be reduced to achieve a high consistency.

Figure 13A:
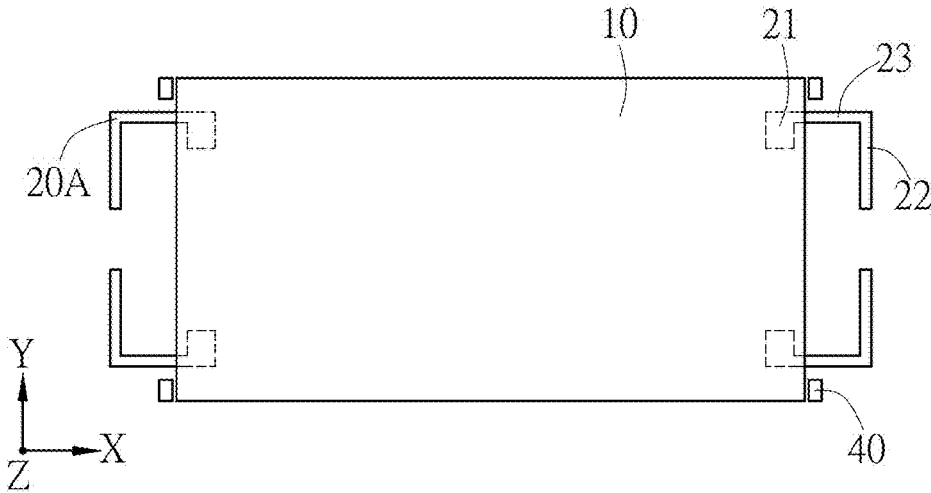
FIG. 13A to FIG. 13C are respectively plan views of the touchpad pressing module in different embodiments of the invention.
Figure 13B:
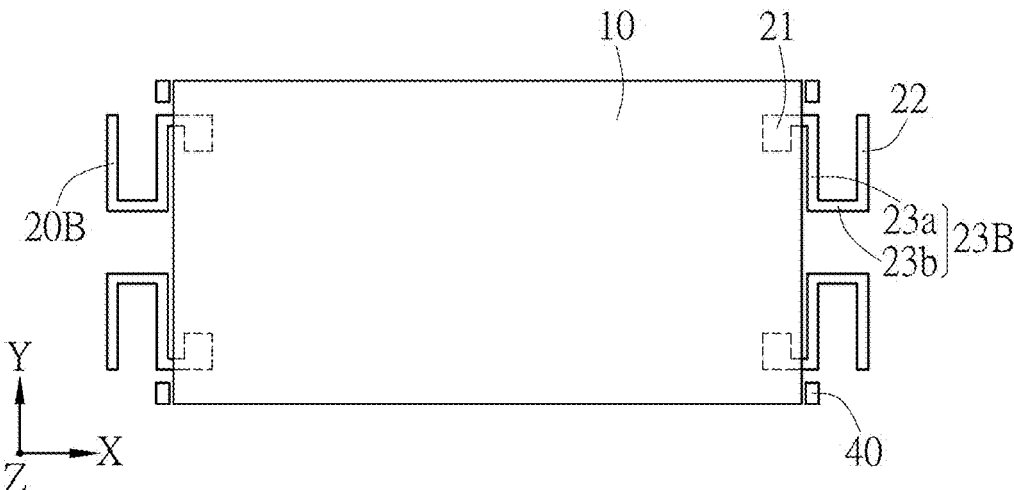
Figure 13C:
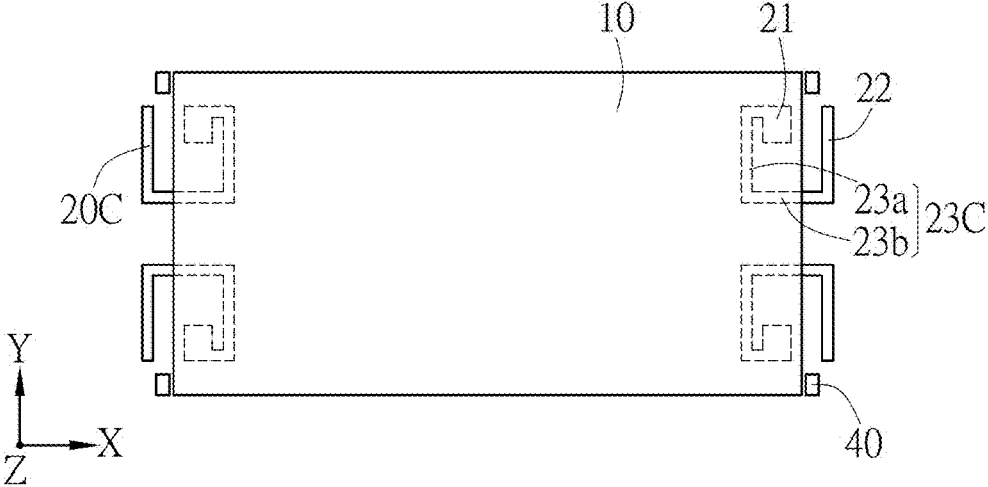

Referring to FIG. 13A to FIG. 13C, FIG. 13A to FIG. 13C are respectively plan views of the touchpad pressing module in different embodiments of the invention. As shown in FIG. 13A, the resilient member 20A can have an L shape. As shown in FIG. 13B, the resilient member 20B can have an S-like shape, wherein the flexible section 23B of the resilient member 20B includes a first extension portion 23a and a second extension portion 23b. The length of the first extension portion 23a is larger than the length of the second extension portion 23b, but not limited thereto. For example, the first extension portion 23a extends along the Y-axis direction and is connected between the inner positioning section 21 and the second extension portion 23b, and the second extension portion 23b extends along the X-axis direction to connect the outer fixing section 22. As shown in FIG. 13C, the resilient member 20C can have a C-like shape, wherein the flexible section 230 of the resilient member 20C has the first extension portion 23a and the second extension portion 23b, and the lengths of the first extension portion 23a and the second extension portion 23b are substantially the same. For example, the first extension portion 23a extends along the Y-axis direction and is connected between the inner positioning section 21 and the second extension portion 23b, and the second extension portion 23b extends along the X-axis direction to connect the outer fixing section 22. According to practical applications, by modifying the shape of the resilient member 20, the deformability of the flexible section 23 can be enhanced, or the suspended support to the touchpad 10 can be promoted.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A touchpad pressing module, comprising:
   a touchpad configured to sense a touch operation thereon;

a plurality of resilient members disposed below the touchpad, each of the plurality of resilient members comprising an inner positioning section, an outer fixing section, and a flexible section, the flexible section connected between the inner positioning section and the outer fixing section; and a baseplate disposed below the touchpad, wherein in a stacking direction of the touchpad and the baseplate, the inner positioning section is located within an orthographic projection of the touchpad, and the outer fixing section is located outside the orthographic projection of the touchpad;

wherein the inner positioning section, the flexible section, and the outer fixing section of the resilient member are sequentially arranged from top to bottom along the stacking direction.

2. The touchpad pressing module of claim 1, further comprising a housing, wherein the housing has a housing opening; the touchpad is disposed in the housing opening; the baseplate is fixed onto the housing.

3. The touchpad pressing module of claim 2, wherein the outer fixing section is adjacent to or partially overlaps where the baseplate and the housing are fixed; the outer fixing section is fixed onto the baseplate or the housing.

4. The touchpad pressing module of claim 2, wherein the housing has an inner rim defining the housing opening; the outer fixing section is adjacent to the inner rim; the flexible section has a length smaller than ½, ⅓, or ¼ of a length of a long side of the touchpad, or the length of the flexible section is smaller than ½ of a length of a short side of the touchpad.

5. The touchpad pressing module of claim 1, wherein an extending direction the outer fixing section crosses an extending direction of the flexible section.

6. The touchpad pressing module of claim 1, further comprising a plurality of limiting structures, wherein the plurality of limiting structures are respectively adjacent to a side of the flexible section of a corresponding one of the plurality of resilient members; in the stacking direction, the plurality of limiting structures are located outside the orthographic projection of the touchpad.

7. The touchpad pressing module of claim 6, wherein each of the plurality of limiting structures comprises an immovable interfering member and a movable interfering member; the immovable interfering member is disposed on the baseplate; the movable interfering member extends from below the touchpad to correspond to the immovable interfering member.

8. The touchpad pressing module of claim 7, further comprising a bracket, wherein the bracket is disposed between the touchpad and the baseplate; the movable interfering member is disposed on the bracket or the touchpad.

9. The touchpad pressing module of claim 6, wherein in a direction, a distance between a center and an edge of the touchpad is a touchpad radius; a distance between the limiting structure and the center of the touchpad is a limiting radius; the limiting radius is larger than the touchpad radius.

10. The touchpad pressing module of claim 6, wherein the plurality of limiting structures are symmetrically disposed around a center of the touchpad.

11. The touchpad pressing module of claim 6, further comprising a housing, wherein the housing has a housing opening and an inner rim defining the housing opening; the touchpad is disposed in the housing opening; in the stacking direction, the plurality of limiting structures overlap the housing and are spaced apart from the inner rim by a gap.

12. The touchpad pressing module of claim 1, wherein the touchpad comprises a switch; the baseplate has a trigger portion disposed corresponding to the switch.

13. The touchpad pressing module of claim 1, further comprising a bracket, wherein the bracket is disposed between the touchpad and the baseplate; an upper surface of the inner positioning section abuts against a lower surface of the bracket.

14. A touchpad pressing module, comprising:

a touchpad configured to sense a touch operation thereon;

a plurality of resilient members disposed below the touchpad, each of the plurality of resilient members comprising an inner positioning section, an outer fixing section, and a flexible section, the flexible section connected between the inner positioning section and the outer fixing section;

a baseplate disposed below the touchpad; and a plurality of limiting structures respectively adjacent to the outer fixing section of a corresponding one of the plurality of resilient members, wherein in a stacking direction of the touchpad and the baseplate, the plurality of limiting structures are located outside an orthographic projection of the touchpad;

wherein the inner positioning section, the flexible section, and the outer fixing section of the resilient member are sequentially arranged from top to bottom along the stacking direction.

15. The touchpad pressing module of claim 14, wherein each of the plurality of limiting structures comprises an immovable interfering member and a movable interfering member; the immovable interfering member is disposed on the baseplate; the movable interfering member extends from below the touchpad and configured to interfere with the immovable interfering member in the stacking direction.

16. The touchpad pressing module of claim 15, further comprising a bracket disposed between the touchpad and the baseplate, wherein an upper surface of the inner positioning section abuts against a lower surface of the bracket; the movable interfering member is disposed on the bracket.

17. The touchpad pressing module of claim 14, further comprising a housing, wherein the housing has a housing opening; the touchpad is disposed in the housing opening; the outer fixing section is fixed onto the baseplate or the housing.

18. The touchpad pressing module of claim 14, wherein the plurality of limiting structures are symmetrically disposed around the touchpad.

19. A touchpad pressing module, comprising:

a touchpad configured to sense a touch operation thereon;

a plurality of resilient members disposed below the touchpad, each of the plurality of resilient members comprising an inner positioning section, an outer fixing section, and a flexible section, the flexible section connected between the inner positioning section and the outer fixing section;

a baseplate disposed below the touchpad; and a bracket disposed between the touchpad and the baseplate, wherein an upper surface of the inner positioning section abuts against a lower surface of the bracket;

wherein in a stacking direction of the touchpad and the baseplate, the inner positioning section is located within an orthographic projection of the touchpad, and the outer fixing section is located outside the orthographic projection of the touchpad.

* * * * *